(12) United States Patent
De Bruijn et al.

(10) Patent No.: US 9,971,112 B2
(45) Date of Patent: May 15, 2018

(54) OPTOELECTRICAL CONNECTOR SYSTEM

(71) Applicant: FCI Asia PTE. LTD., KA Place (SG)

(72) Inventors: Jeroen De Bruijn, Veghel (NL); Alexander Eichler-Neumann, Berlin (DE)

(73) Assignee: FCI Asia Pte. Ltd., Singapore (SG)

( * ) Notice: Subject to any disclaimer, the term of this patent is extended or adjusted under 35 U.S.C. 154(b) by 0 days. days.

(21) Appl. No.: 15/023,125

(22) PCT Filed: Sep. 18, 2014

(86) PCT No.: PCT/US2014/056223
§ 371 (c)(1),
(2) Date: Mar. 18, 2016

(87) PCT Pub. No.: WO2015/042225
PCT Pub. Date: Mar. 26, 2015

(65) Prior Publication Data
US 2016/0231514 A1  Aug. 11, 2016

Related U.S. Application Data

(60) Provisional application No. 61/879,362, filed on Sep. 18, 2013.

(51) Int. Cl.
G02B 6/42 (2006.01)

(52) U.S. Cl.
CPC ............ *G02B 6/424* (2013.01); *G02B 6/428* (2013.01); *G02B 6/4214* (2013.01); *G02B 6/4239* (2013.01); *G02B 6/4249* (2013.01); *G02B 6/4292* (2013.01); *G02B 6/4231* (2013.01); *G02B 6/4256* (2013.01); *G02B 6/4284* (2013.01)

(58) Field of Classification Search
USPC .......................................... 385/89
See application file for complete search history.

(56) References Cited

U.S. PATENT DOCUMENTS

| | | | |
|---|---|---|---|
| 2002/0031313 A1* | 3/2002 | Williams | G02B 6/3825 385/92 |
| 2003/0180012 A1 | 9/2003 | Deane et al. | |
| 2005/0254758 A1 | 11/2005 | Kropp | |
| 2006/0023998 A1 | 2/2006 | Williams et al. | |
| 2006/0164738 A1 | 7/2006 | Yamamoto et al. | |
| 2007/0223865 A1 | 9/2007 | Lu et al. | |
| 2008/0044141 A1 | 2/2008 | Willis et al. | |

(Continued)

OTHER PUBLICATIONS

International Search Report and Written Opinion for International Application No. PCT/US2014/056223 dated Mar. 17, 2015.

(Continued)

*Primary Examiner* — Eric Wong
(74) *Attorney, Agent, or Firm* — Wolf, Greenfield & Sacks, P.C.

(57) ABSTRACT

An optoelectrical connector system can include an optical coupler that is configured to be positioned over a photonic device on the PCB. The optoelectrical connector system can further include a connector housing that is configured to be attached to the optical coupler after the optical coupler is positioned over the photonic device, so that the coupler can be aligned and fixed without the housing attached thereto.

19 Claims, 2 Drawing Sheets

(56) References Cited

U.S. PATENT DOCUMENTS

2008/0232737 A1* 9/2008 Ishigami .............. G02B 6/4201
                                                    385/14
2011/0164851 A1   7/2011 Ishigami et al.
2011/0268390 A1   11/2011 Yi et al.
2011/0311188 A1   12/2011 Wang et al.
2012/0063729 A1   3/2012 Fujiwara et al.
2014/0219603 A1*  8/2014 Laughlin .................. G02B 6/43
                                                    385/14
2015/0293318 A1* 10/2015 Droesbeke ........... G02B 6/3897
                                                    385/89

OTHER PUBLICATIONS

International Preliminary Report on Patentability for International Application No. PCT/US2014/056223 dated Mar. 31, 2016.
Chinese Office Action for Chinese Application No. 201480051486.X dated Mar. 3, 2017.
Extended European Search Report for European Application No. 14845674.2 dated Mar. 3, 2017.

* cited by examiner

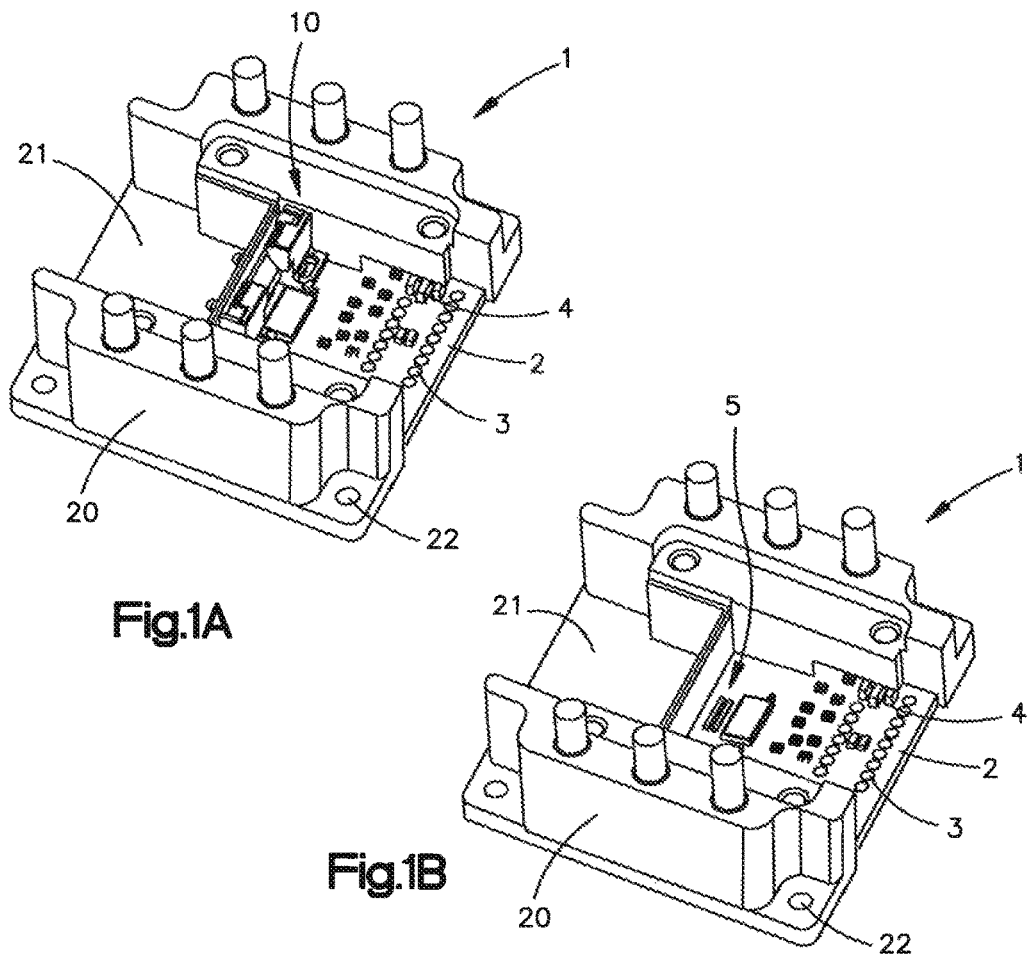
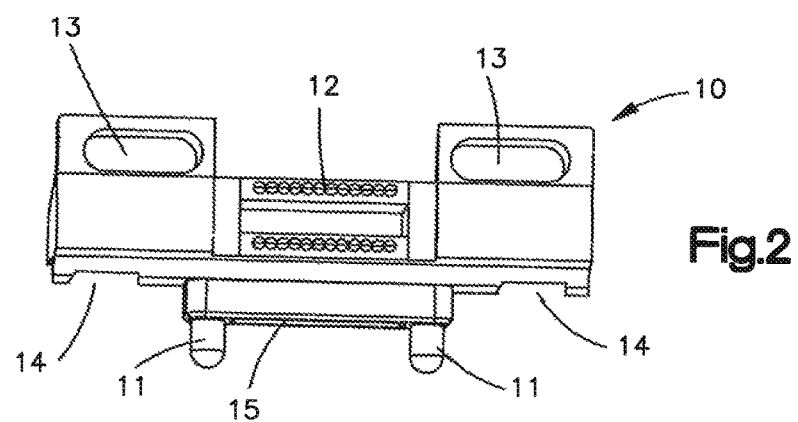

OPTOELECTRICAL CONNECTOR SYSTEM

CROSS-REFERENCE TO RELATED APPLICATIONS

This application is the National Stage of International Application No. PCT/US2014/056223, filed Sep. 18, 2014, which claims the benefit of U.S. application No. 61/879,362, filed Sep. 18, 2013, the disclosures of which are incorporated herein by reference in their entireties.

FIELD OF THE DISCLOSURE

The present disclosure relates to an optoelectrical connector system and a method to align an optoelectrical connector with a photonic device on a printed circuit board (PCB).

BACKGROUND

In many electronic applications it is necessary to connect signal lines as for example optical signal lines to printed circuit boards. To this end, it is necessary to provide the photonic devices arranged on the PCB with a suitable optical connector, respectively interface, to transfer light signals from a fiber cable to the photonic device or vice-versa. A major problem in this context is to correctly align the optoelectrical connector with the photonic device on the PCB, since the involved tolerances are in the range of a few μm only.

From the EP 0 635 741 A2 an optoelectronic or optoelectrical connector (interface) is known, wherein the photonic device on the PCB, i.e. one or more light emitting diode(s) (LED), vertical cavity surface emitting laser (VCSEL), photo diode(s) etc., is capsuled on the PCB by means of a suitable resin. The materials used fir this overmolded portion are optically clear and have a refractive index that is similar to the refractive index of the optical fibers used, whereby light is allowed to pass through the overmolded material from the photonic device to the optical fibers, respectively vice-versa. According to this document, this overmolding process allows the an accurate and efficient interconnection or coupling of the optical fibers to the photonic device. However, the method described therein requires a complex molding operation.

From US 2006/0067630 A1 a module assembly for an optical link is known, which is made from two frame parts, whereby one of the frame parts is co-molded with the lead frame supporting the photonic device and the corresponding electronic components required to support the conversion of electronic signals to optical signals and vice-versa. The two frame parts comprise alignment means in form of pins and corresponding alignment holes, to precisely align the two parts with each other.

From U.S. Pat. No. 6,130,979 an assembly for use in transferring optical signals is known, wherein an optical fiber ferrule is provided with a pair of alignment pins to mount and align the ferrule to a carrier of an optical source. The optical source, like for example a laser array, is arranged in a connector housing but not on a PCB.

It is desirable to provide an optoelectrical connector system that offers an improved way of aligning with a photonic device on a PCB.

SUMMARY

According to the present disclosure, an optoelectrical connector system is suggested, which comprises an optical coupler and a connector housing as separate parts, whereby the housing is configured to be attached to the optical coupler. The optical coupler is in turn configured to be mounted on a PCB to be positioned over a photonic device on the PCB. According to the one embodiment, the housing can be configured such it can be attached to the coupler after the optical coupler is positioned over the photonic device. In other words, the optical coupler is first mounted to the PCB and precisely aligned with the photonic device. After the optical coupler is fixed in the correctly aligned position, the housing is afterwards attached to the coupler. Thereby, a direct connection between coupler and connector housing is only made after the coupler is mounted to the PCB. Since the positioning accuracy of the coupler is much better than the component accuracy of the (relatively inexpensive) housing, a highly precise and yet inexpensive optoelectrical connector system is achieved.

The photonic device can for example be one or more light emitting diodes (LED's), vertical cavity surface emitting laser(s) (VCSEL), or the like. The photonic device can also be one or more photo-receiver(s), such as photo-diodes and similar.

The optical coupler is preferably designed such that the mounting of the coupler to the PCB is only possible when the connector housing is not yet attached to the coupler. Thus, it is possible to design a connector housing which at least partially covers the coupler and thereby covers or blocks the access to the fixation means of the coupler. Preferably, the optical coupler comprises alignment means to precisely align the coupler with the photonic device.

Preferably, the connector housing comprises a receptacle to matingly receive a corresponding counter connector. Such a counter connector can for example be a plug connector of an optical fiber cable as for example an MT ferrule connector. The counter connector, as e.g. the MT ferrule connector, can thus be securely mated or coupled with the connector housing, whereby a suitable retention force can be achieved. The actual alignment of the counter connector with the optical coupler is preferably achieved by means of suitable guiding means to align the corresponding counter connector with the coupler. However, the coupler itself does preferably not comprise any receptacle to matingly receive the counter connector. The mating receptacle is only provided on the connector housing.

In preferred embodiments, the coupler and the connector housing are glued together after the coupler is mounted to the PCB and the connector housing is arranged thereon. To this end, in preferred embodiments, coupler and connector housing have suitable fastening tabs and corresponding fastening slots, which interact with each other to achieve a form fitting connection. This form fitting connection is preferably additionally reinforced by the application of a suitable adhesive, as in particular an epoxy resin.

Generally preferred, the coupler and the connector housing further comprise alignment tabs and corresponding alignment apertures to facilitate the alignment of housing and coupler with respect to each other. However, as it is clear to the skilled person, the alignment of housing and coupler does not necessarily be as precise as the alignment of the optical coupler with the photonic device. The connector housing can include fixation means that fixes the connector housing directly to the printed circuit board.

Preferably, the coupler comprises light guiding means to guide light from one side of the coupler to an other side of the coupler, and most preferably these light guiding means are suitable to deflect the light at a suitable angle.

The present disclosure also describes a method to align an optoelectrical connector system, such as a connector system as described above, with a photonic device on a PCB. In this method, firstly a PCB with a photonic device is provided and then an optical coupler is mounted thereon and over the photonic device. After the coupler is mounted and firmly fixed in its correct alignment position with the photonic device, a suitable connector housing is attached to the optical coupler. The connector housing, as described above, has for example a suitable receptacle to matingly receive a corresponding counter connector, so that the optical coupler itself does not require any such receptacles.

The present disclosure describes the advantage that most parts of the connector system do not necessarily have to be manufactured regarding tight tolerances, since it is only sufficient that the optical coupler is precisely aligned with the photonic device, i.e. only the corresponding parts of the coupler and/or the photonic device have to be manufactured with very tight tolerances, whereas the housing itself and the mounting of the housing to the coupler and/or the PCB needs not to be very accurate. The input/output connector, i.e. the corresponding counter connector as for example an MT ferrule connector, can float in the connector housing, where it is pre-guided and the actual optical alignment is then done directly between the alignment means of the coupler and the corresponding alignment means in or on the MT ferrule. The alignment between the coupler and the connector housing can be less accurate as long as it still ensures the correct guidance of the MT ferrule towards or onto the coupler.

Preferably, the fixation between the coupler and the housing is achieved by means of a suitable adhesive to secure the position of the housing when the counter connector is inserted in the corresponding receptacle. In other words, the problem of a precise alignment of the optoelectrical connector with respect to the photonic device is solved by decoupling the optical coupler from the surrounding housing. Both are separate parts, which are only assembled after the optical coupler is correctly aligned and fixed in its correct position with regard to the photonic device. The optical coupler can be accurately positioned under regard of the necessary tolerances (which are in the range of only a few micrometers), while the connector housing needs not to be that accurately positioned.

BRIEF DESCRIPTION OF THE DRAWINGS

The foregoing summary, as well as the following detailed description of example embodiments of the application, will be better understood when read in conjunction with the appended drawings, in which there is shown in the drawings example embodiments for the purposes of illustration. It should be understood, however, that the application is not limited to the precise arrangements and instrumentalities shown. In the drawings:

FIG. 1A is a schematic perspective view of an optoelectrical connector system constructed in accordance with one embodiment, including an optical coupler and a connector housing;

FIG. 1B is a schematic perspective view of a portion of the optoelectrical connector system illustrated in FIG. 1, with portions removed;

FIG. 2 is a three-dimensional schematic view of the optical coupler illustrated in FIG. 1;

DETAILED DESCRIPTION

Figure 3:
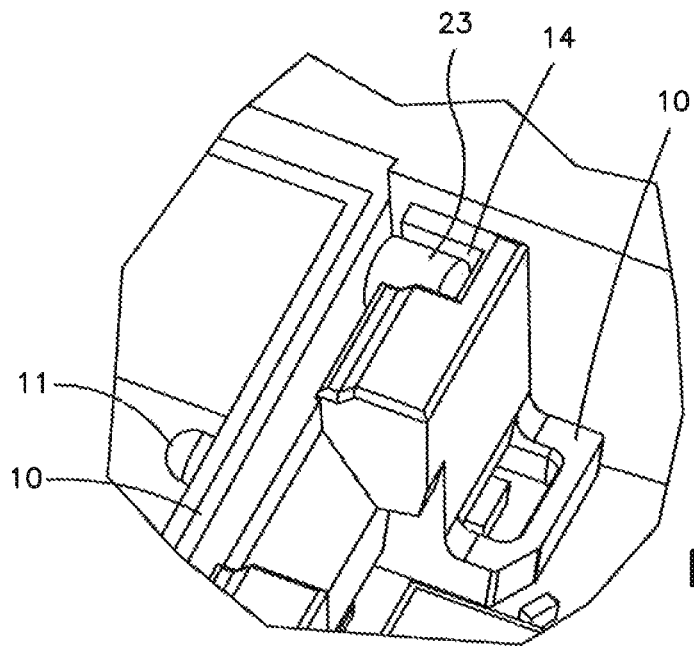
FIG. 3 is an enlarged perspective view of a portion of FIG. 1.

Referring to FIG. 1, an optoelectrical connector system 1 includes an optical coupler 10 and a connector housing 20 that is separate from the optical coupler 10. The optical coupler 10 can be mounted to a substrate, such as a printed circuit board (PCB) 2 in any manner desired. The printed circuit board 2 can include a plurality of electrical traces 3 and a number of electronic components 4, such as integrated circuits, resistors, capacitors and the like. The optical coupler 10 can be positioned over a photonic device 5 that is, in turn, mounted onto the printed circuit board 2. The photonic device 5 can for example be one or more light emitting diodes (LED's), vertical cavity surface emitting laser(s) (VCSEL), or the like. The photonic device 5 can also be one or more photo-receiver(s), such as photo-diodes and similar. The optical coupler 10 can be fixedly attached to the printed circuit board 2 to assure that the optical coupler 10 is precisely aligned with the photonic device 5. As will be described in more detail below, the connector housing 20 defines a receptacle 21 that is sized to receive a counter connector 30, such that a mating face 33 of counter connector 30 is aligned with a light input/output face 15 of the optical coupler 10 so as to be in optical communication with the light input/output face 15. Accordingly, light signals can be exchanged between the optical coupler 10 and the counter connector 30, and the optical coupler 10 can transmit the light signals to the photonic device 5.

The connector housing 20 can be configured to be mounted to the printed circuit board 2. For instance, the connector housing 20 can include any suitable fixation member configured to attach the connector housing 20 to the printed circuit board. In one example, the fixation member can be configured as at least one fixation aperture 22, such as a plurality of apertures, that extends through the connector housing 20. The fixation apertures 22 are configured to receive any suitable fastener, such as a screw, that fixes the connector housing 20 to the printed circuit board. For instance, the screws can extend through respective ones of the fixation apertures 22 and attach to the printed circuit board 2, thereby attaching the connector housing 20 to the printed circuit board 2. In one example, the screws can threadedly purchase with the printed circuit board 2. In another example, the screws can extend through the printed circuit board 2, and a nut can threadedly mate onto an end of the screw so as to capture the connector housing 20 and the printed circuit board 2 between the heads of the screws and the respective nuts. As will be described in more detail below, the connector housing 20 can further be configured to attach to the optical coupler 10.

Figure 4:
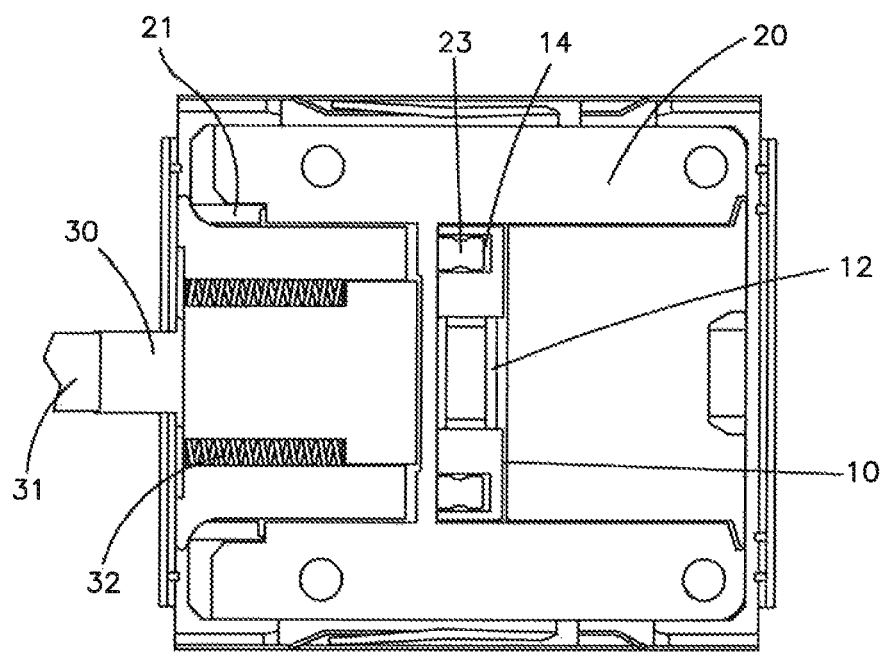
FIG. 4 is atop plan view of the optoelectrical connector system illustrated in FIG. 1, shown mated to a corresponding counter connector.

The connector housing 20 further defines a receptacle 21 designed to matingly receive a corresponding counter connector 30 as in particular a connector of an optical fiber cable (see FIG. 4). The receptacle 21 can be configured as a void that extends into the connector housing 20 along a transverse direction T toward the printed circuit board 2, and further extends into the connector housing 20 along a longitudinal direction L that is perpendicular to the transverse direction T and is substantially parallel to the surface of the printed circuit board 2. Thus, the receptacle 21 can be open to an outer periphery of the connector housing 20 with respect to both the longitudinal direction L and the transverse direction T. The connector housing 20 can further define a divider wall 25 that at least partially defines the receptacle 21. The divider wall 25 can be disposed between the receptacle 21 and the light input/output face 15 of the optical coupler 10 when the optical coupler 10 and the connector housing 20 are supported by the printed circuit board 2.

Referring now to FIG. 2, the optical coupler 10 includes a coupler body 16, a light guide 12 that extends through the body, and a light input/output face 15 that is in optical communication with the light guide 12. The light input/output face 15 can be supported at a longitudinal end of the body 16, and thus can face the longitudinal direction L. In particular, the light input/output face can face the receptacle 21 of the connector housing 20 when the optical coupler 10 and the connector housing 20 are supported by the printed circuit board 2. To this end, the connector housing 20 can define an aperture that extends through the divider wall 25, or the divider wall 25 can define a cutout, such that the light input/output face 15 faces the receptacle 21. It is appreciated that the connector housing 20 can be mounted to the printed circuit board 2, so as to be supported by the printed circuit board 2. The connector housing 2 can further be attached to the optical coupler 10, such that the optical coupler 10 to also be supported by the printed circuit board 2. The light guide 12 can extend through the coupler body 16, and can be configured to guide light from a first side of the coupler body 16 to a second side of the coupler body 16 that is different than the first side. In one example, the light guide 12 can be configured to deflect the light at any suitable angle so as to direct the light from the first side to the second side. For instance, the first and second sides can be oriented substantially perpendicular to each other, or otherwise angularly offset from each other as desired. Alternatively, the first and second sides can be parallel to each other.

The optical coupler 10 can further include at least one alignment member that is supported by the coupler body 16, and is configured to align with a corresponding alignment member of the counter connector 30. For instance, the at least one alignment member of the optical coupler 10 can be configured to extend into the receptacle 21 when the optical coupler 10 and the connector housing 20 are supported by the printed circuit board 2. To this end, the connector housing 20 defines at least one through-hole or aperture that extend through the divider wall 25 along the longitudinal direction L, and receive the at least one alignment member of the optical coupler 10. The at least one alignment member of the optical coupler 10 can be configured as at least one alignment tab 11 extends from the coupler body 16 in the longitudinal direction, and is configured to be received by the corresponding alignment member of the counter connector 30, which can be configured as an alignment recess. Thus, when the counter connector 30 is inserted into the receptacle 21, the at least one alignment recess of the counter connector 30 receives the at least one alignment tab 11 of the optical coupler 10, thereby aligning the optical coupler 10 with the counter connector 30. Alternatively the alignment members of the optical coupler 10 can be configured as a recess, and the corresponding alignment members of the counter connector 30 can be configured as a projection that is sized to be received by the recess.

In one example, the optical coupler 10 includes first and second alignment tabs 11 that are spaced from each other along a lateral direction A that is perpendicular to both the longitudinal direction L and the transverse direction T. The alignment tabs 11 extend through respective apertures through the divider wall 25 and into the receptacle 21 (see also FIG. 3). The lateral direction A can also be oriented parallel to the surface of the printed circuit board 2. The light input/output face 15 can be disposed between the first and second alignment tabs 11 along the lateral direction A. For instance, the alignment tabs 11 can project outward with respect to the light input/output face 15 along the lateral direction A. It should be appreciated that the alignment tabs 11 can further be referred to as guides that guide the insertion of the counter connector 30 into the receptacle 21 as the apertures of the counter connector 30 receive the alignment tabs 11.

The optical coupler 10 can further include a pair of alignment members configured to align the optical coupler 10, and in particular the light guide 12, with the photonic device 5. The optical coupler 10 can define a pair of apertures 13 that extend through respective ones of the alignment members. The alignment members can be configured as projections 17 that extend out from the coupler body 16. For instance, the projections 17 can extend out from the coupler body 16 along the longitudinal direction L, such that the coupler body 16 is disposed between the projections 17 and the alignment tabs 11 with respect to the longitudinal direction L. The projections 17 can be spaced from each other along the lateral direction A so as to define a recess between the projections with respect to the lateral direction A. The apertures 13 can extend through respective ones of the projections 17 along the transverse direction T. The printed circuit board 2 can include a counterpart structure that engages the alignment members of the optical coupler, such as guiding rods or the like, that extends through apertures 13 so as to align the optical coupler 10 with the photonic device 5.

The optical coupler 10 can further define at least one fastening slot 14 that is configured to receive a complementary at least one fastening tab 23 (see FIG. 3) of the connector housing 20 so as to attach the connector housing 20 to the optical coupler 10. For instance, the optical coupler 10 can define first and second fastening slots 14 that are each configured to receive a respective one of first and second fastening tabs 23 of the connector housing 20 so as to attach the connector housing 20 to the optical coupler 10. The fastening slots 14 can extend into the coupler body 16 along the transverse direction T, such that when the optical coupler 10 is mounted to the printed circuit board 2 and aligned with the photonic device 5, the fastening slots 14 extend toward from the printed circuit board 2, and can thus be open along a direction away from the printed circuit board 2. In this regard, it should be appreciated that the optical coupler 10 can define an inner end 19a that faces the printed circuit board 2 when the optical coupler 10 is mounted to the printed circuit board 2, and an outer end 19b that faces away from the printed circuit board 2 when the optical coupler 10 is mounted to the printed circuit board 2. Thus, the outer end 19b and the inner end 19a can be opposite each other, and spaced from each other along the transverse direction T. The fastening slots 14 can face away from the printed circuit board 2 along the transverse direction T when the when the optical coupler 10 is mounted to the printed circuit board 2. For instance, the fastening slots 14 can extend into the outer end 19b of the optical coupler 10 at the coupler body 16 at least toward the inner end 19a. The fastening slots 14 can terminate prior to reaching the inner end 19a. Alternatively, the fastening slots 14 can extend into the outer end and through to the inner end 19a. It should be appreciated that the optical coupler 10 can be symmetrical about a plane that is defined by the transverse direction T and the longitudinal direction L, and is positioned centrally on the optical coupler 10 with respect to the lateral direction A. Thus, the alignment tabs 11 can each be equidistantly spaced from the plane. Similarly, the projections can each be equidistantly spaced from the plane. Similarly, the fastening slots 14 can each be equidistantly spaced from the plane. The plane can further bisect the light input/output face 15.

Referring now to FIG. 3, and as described above, the connector housing 20 is configured to be attached to the optical coupler 10. In one example, the connector housing 20 can be configured to attach to the optical coupler 10 after the optical coupler 10 has been positioned over the photonic device 5. Accordingly, the optical coupler 10 can be precisely aligned with the photonic device 5. Next, the connector housing 20 can be attached to the optical coupler 10. Accordingly, in this example, a direct connection between optical coupler 10 and connector housing 20 is made after the optical coupler 10 is aligned with the photonic device 5 and after the optical coupler 10 is mounted to the printed circuit board 2. In one example, the optoelectrical connector system 1 can be configured such that the optical coupler 10 is prevented from being mounted to the printed circuit board 2 when the connector housing 20 is mounted to the printed circuit board 2. Further, the optical coupler 10 and the connector housing 20 can be configured such that the optical coupler 10 can only be mounted to the printed circuit board 2 when the connector housing 20 is not attached to the optical coupler 10. For instance, when the connector housing 20 is mounted to the printed circuit board 2, the connector housing 20 can at least partially cover the optical coupler 10. Accordingly, the connector housing 20 interferes with mounting the optical coupler 10 to the printed circuit board when the connector housing is attached to the printed circuit board 2 prior to attachment of the optical coupler 10 to the printed circuit board. As a result, the connector housing 20 interferes with mounting the optical coupler 10 with the printed circuit board 2 when the connector housing 20 is attached to the optical coupler 10 prior to attachment of the optical coupler 10 to the printed circuit board 2.

As described above, the connector housing 20 is configured to be attached to the optical coupler 10 in the fastening slots 14 so as to assume an attached condition. For instance, the connector housing 20 can include at least one fastening tab 23 that is sized to be at least partially received in the respective at least one fastening slot 14. In one example, the at least one fastening tab 23 does not fill an entirety of the at least one fastening slot 14 when at least a portion of the at least one fastening tab 23 is inserted into the at least one fastening slot 14. Thus, a remaining space is defined in the fastening slot 14 after the at least one fastening tab 23 is at least partially or fully disposed in the respective at least one fastening slot 14. The at least one fastening slot 14 can define a depth in the transverse direction T that is greater than the dimension of the at least one fastening tab 23 in the transverse direction T, such that an entirety of the at least one fastening tab 23 can be received in the respective at least one fastening slot 14. In one example, after the at least one fastening tab 23 is at least partially disposed in the respective at least one fastening slot 14, the remaining space inside of the at least one fastening slot 14 can be filed with an adhesive that fastens the at least one fastening tab 23 to the optical coupler 10. In one example, the adhesive can be configured as an epoxy resin, to firmly glue connector housing 20 and optical coupler 10 with each other. It should be appreciated, as described above, that in one example the optical coupler 10 and the connector housing 20 are glued together after the optical coupler 10 has been aligned with the photonic device 5, and the connector housing 20 is arranged thereon on the printed circuit board 2. Further, the optical coupler 10 and the connector housing 20 can be glued together after the connector housing 20 has been attached to the printed circuit board 2.

In one example, the at least one fastening slot 14 includes the first and second fastening slots 14, and the at least one fastening tab 23 includes the first and second fastening tabs 23. The first and second fastening tabs 23 can extend from the divider wall 25 along the longitudinal direction L in a direction away from the receptacle 21. Thus, the divider wall 25 can be disposed between the fastening tabs 23 and the receptacle 21.

Thus, it will be appreciated that the fixation between the optical coupler 10 and the connector housing 20 can be achieved by a suitable adhesive that secures the position of the connector housing 20 when the counter connector 30 is inserted in the receptacle 21. In other words, the optical coupler 10 is separate from the housing 20, and can thus be precisely aligned with the photonic device 5 prior to attachment of the connector housing 20 to either or both of the optical coupler 10 and the printed circuit board 2. Accordingly, the optical coupler 10 can be accurately positioned with respect to the photonic device 5 under tight tolerances (which are in the range of only a few micrometers), while the tolerance of the connector housing 20 is looser than the tolerance of the optical coupler 10 position. It will be appreciated that the connector housing 20 can alternatively define the fastening slots 14, and the optical coupler 10 can comprise the fastening tabs 23. Thus, one of the connector housing 20 and the optical coupler 10 can include one of at least one fastening slot 14 and at least one fastening tab 23, the other of the connector housing 20 and the optical coupler 10 includes the other of the at least one fastening slot 14 and the at least one fastening tab 23, and the at least one fastening tab 23 is configured to be at least partially inserted into the at least one fastening slot 14 and adhesively secured therein.

Referring now to FIG. 4, and as described above, the receptacle 21 is sized to receive at least a portion of a counter connector 30 such that the counter connector 30 is in optical communication with the light input/output face 15 of the optical coupler 10, after the optical coupler 10 and the connector housing 20 are supported by the printed circuit board 2. Thus, the mating face 33 of the counter connector 30 and the light input/output face 15 of the optical coupler 10 are configured to exchange light signals. Accordingly, the counter connector 30 can be placed in optical communication with the photonic device 5. The counter connector 30 can be configured as a plug connector of an optical fiber cable. For instance, the counter connector 30 can be configured as a mechanical transfer (MT) ferrule connector, and can include a fiber cable 31. The fiber cable 31 can, for instance, be a glass fiber cable.

The counter connector 30 can mate with the connector housing 20 to thereby achieve a retention force that retains the counter connector mated with the connector housing 20. Further, as described above, the alignment tabs 11 are configured to be received by the counter connector 30 when the counter connector is inserted in the receptacle 21, thereby align the counter connector 30 with optical coupler 10 so as to place the counter connector 30 in optical communication with the optical coupler 10. The counter connector 30 can be configured to attach to the connector housing 20 in the receptacle 21. The attachment of the counter connector 30 to the connector housing 20 can provide strain relief for the optical coupler 10. In other words, in one example, the counter connector 30 can be directly coupled to the connector housing, and only indirectly attached to the optical coupler 10. Accordingly, a force applied to the counter connector 30 can be transferred from the counter connector to the connector housing 20, and from the connector housing 20 to the printed circuit board 2. The optical coupler 10 is thus isolated from the applied force.

It should be appreciated, however, that the mating face 33 of the counter connector 30 can be placed in physical contact with the light input/output face 15 of optical coupler 10. For instance, the counter connector 30 can include a spring member 32 that biases the mating face 33 against the light input/output face 15 of the optical coupler 10. For instance, the spring member 32 can be configured as a compressional spring 32 that has a first end that bears, directly or indirectly, against a surface of the connector housing 20, and a second end that bears against a body that carries the mating face 33. The compression spring 32 can be oriented along the longitudinal direction L so as to apply a biasing force in the longitudinal direction L.

It should be appreciated that a method can be provided to assemble the optoelectrical connector system 1, and to align the optoelectrical connector system 1 with the photonic device 5. The method can include the step of providing the printed circuit board 2 with the photonic device 5 mounted thereon. The method can include the step of aligning the optical coupler 10 with the photonic device 5 on the printed circuit board 2 such that the light guide 12 is operably aligned with the photonic device 5, in the manner described above. The method can further include the step of mounting the optical coupler 10 to the printed circuit board 2. Next, the connector housing 20 can be mounted to the printed circuit board 2. For instance, one or more fasteners can extend through the fixation apertures 22 to attach the connector housing 20 to the printed circuit board 2. With the connector housing 20 mounted to the printed circuit board 2 and the optical coupler aligned with the photonic device 5, the connector housing 20 can subsequently be attached to the optical coupler 10, thereby mounting the optical coupler 10 to the printed circuit board 2. It should be appreciated that the optical coupler 10 can be directly mounted to the printed circuit board 2. Alternatively, the optical coupler 10 can be indirectly mounted to the printed circuit board 2 through attachment to the connector housing 20 that is directly mounted to the printed circuit board 2. For instance, when the optical coupler 10 is aligned with the photonic device 5 and the connector housing 20 is mounted to the printed circuit board 2, the fastening tabs 23 can be at least partially inserted into the fastening slots 14, and at least a portion of the remaining space can be filled with an adhesive, such as an epoxy. It should be appreciated that the connector housing 20 can be attached to the printed circuit board 2 before or after the connector housing 20 is attached to the optical coupler 10. The connector housing 20 can then receive the counter connector 30, so as to place the mating face 33 in optical communication with the light input/output face 15, and thus in optical communication with the photonic device 5.

It should be appreciated that the alignment and mounting of the optoelectrical connector system 1 onto the printed circuit board 2 is more simple and cost efficient than the prior art. Further, in one example, the alignment and mounting of the optoelectrical connector system 1 onto the printed circuit board 2 does not require the molding operations as in the prior art.

The foregoing description is provided for the purpose of explanation and is not to be construed as limiting the invention. While various embodiments have been described with reference to preferred embodiments or preferred methods, it is understood that the words which have been used herein are words of description and illustration, rather than words of limitation. Furthermore, although the embodiments have been described herein with reference to particular structure, methods, and embodiments, the invention is not intended to be limited to the particulars disclosed herein. For instance, it should be appreciated that structure and methods described in association with one embodiment are equally applicable to all other embodiments described herein unless otherwise indicated. Those skilled in the relevant art, having the benefit of the teachings of this specification, may effect numerous modifications to the invention as described herein, and changes may be made without departing from the spirit and scope of the invention, for instance as set forth by the appended claims.

The invention claimed is:

1. An optoelectrical connector system, comprising:
   an optical coupler that includes a coupler body that defines a light input/output face, and a light guide that extends through the coupler body and is in optical communication with the input/output face, wherein the optical coupler is configured to be mounted on a printed circuit board such that the light guide is aligned with a photonic device that is mounted on the printed circuit board; and
   a connector housing that is separate from the optical coupler and configured to attach directly to the printed circuit board and to mate with a counter connector such that the counter connector is in optical communication with the light input/output face, wherein the connector housing is configured to attach to the optical coupler after the light guide of the optical coupler has been aligned with the photonic device.

2. The optoelectrical connector system of claim 1, wherein the optical coupler is designed such that the coupler is mountable onto the printed circuit board only when the connector housing is not attached to the coupler.

3. The optoelectrical connector system of claim 1, wherein the optical coupler is configured to precisely align the light guide with the photonic device.

4. The optoelectrical connector system of claim 1, wherein the connector housing defines a receptacle that is sized to receive the counter connector so as to mate the counter connector with the connector housing.

5. The optoelectrical connector system of claim 4, wherein the optical coupler does not define any receptacle that matingly receives a corresponding counter connector.

6. The optoelectrical connector system of claim 1, wherein the optical coupler comprises an alignment member that is configured to align a mating face of the counter connector with the input/output face of the optical coupler.

7. The optoelectrical connector system of claim 1, wherein the optical coupler and connector housing are glued together.

8. The optoelectrical connector system of claim 7, wherein the connector housing and the optical coupler comprise at least one mating recess feature and protrusion feature wherein the protrusion feature is configured to be at least partially inserted into the recess feature and adhesively secured therein.

9. The optoelectrical connector system of claim 1, wherein the optical coupler is located within a region occupied by the connector housing when the connector housing is attached to the printed circuit board.

10. The optoelectrical connector system of claim 1, wherein the optical coupler and the connector housing comprises alignment tabs and corresponding alignment apertures to align to the connector housing and the optical coupler with respect to each other.

11. The optoelectrical connector system of claim 1, further comprising the counter connector.

12. The optoelectrical connector system of claim 1, wherein the counter connector comprises a mechanical transfer ferrule connector.

13. A method for aligning an optoelectrical connector system with a photonic device arranged on a printed circuit board (PCB) comprising a photonic device arranged thereon, the method comprising the steps of:
   aligning a light guide of an optical coupler with the photonic device; and
   after the aligning step, attaching a connector housing to the PCB in a region that surrounds the optical coupler, wherein the connector housing defines a receptacle configured to receive a counter connector having a fiber cable attached thereto, and wherein an input/output face of the optical coupler that is in optical communication with the light guide faces the receptacle.

14. The method as recited in claim 13, wherein attaching the connector housing to the optical coupler comprises:
   engaging a feature on the connector housing with a mating feature on the optical coupler; and
   adhering the connector housing to the optical coupler with an adhesive.

15. The method as recited in claim 13, further comprising the step of inserting the counter connector into the receptacle, thereby placing the counter connector in optical communication with the input/output face.

16. The optoelectrical connector system of claim 1, wherein the optical coupler includes at least one protruding or recessed feature that engages with at least one mating recessed or protruding feature on the counter connector to align the counter connector with respect to the optical coupler.

17. The optoelectrical connector system of claim 1, wherein the light guide redirects light by approximately 90 degrees.

18. The optoelectrical connector system of claim 1, wherein the optical coupler is configured to attach or adhere to the connector housing after mounting the connector housing, and the connector housing includes a receptacle into which the counter connector having an attached fiber cable is inserted.

19. The optoelectrical connector system of claim 18, wherein the connector housing provides strain relief for the counter connector and attached fiber cable so as to reduce strain on the optical coupler.

* * * * *